(12) United States Patent
Stoddard et al.

(10) Patent No.: US 12,469,725 B2
(45) Date of Patent: Nov. 11, 2025

(54) METHOD FOR DETERMINING CORRECTIVE FILM PATTERN TO REDUCE SEMICONDUCTOR WAFER BOW

(71) Applicant: Delta Design, Inc., Poway, CA (US)

(72) Inventors: Ryan J. Stoddard, Seattle, WA (US); Jonathan L. Herlocker, Seattle, WA (US); Matt McLaughlin, Seattle, WA (US)

(73) Assignee: Delta Design, Inc., Poway, CA (US)

( * ) Notice: Subject to any disclaimer, the term of this patent is extended or adjusted under 35 U.S.C. 154(b) by 990 days.

(21) Appl. No.: 17/359,626

(22) Filed: Jun. 27, 2021

(65) Prior Publication Data

US 2022/0415683 A1 Dec. 29, 2022

(51) Int. Cl.
- H01L 21/67 (2006.01)
- G06N 3/045 (2023.01)
- G06N 3/088 (2023.01)

(52) U.S. Cl.
CPC ....... *H01L 21/67288* (2013.01); *G06N 3/045* (2023.01); *G06N 3/088* (2013.01)

(58) Field of Classification Search
CPC ... G06N 3/045; G06N 3/088; H01L 21/67288
See application file for complete search history.

(56) References Cited

U.S. PATENT DOCUMENTS

| | | | |
|---|---|---|---|
| 5,985,771 A | 11/1999 | Moore | |
| 8,476,146 B2 | 7/2013 | Chen | |
| 8,685,201 B2 | 4/2014 | O'Rourke | |
| 9,043,189 B2 | 5/2015 | Wallace | |
| 9,187,984 B2 | 11/2015 | Usadi | |
| 9,824,894 B2 | 11/2017 | deVilliers | |
| 10,192,739 B2 | 1/2019 | Storck | |
| 10,379,061 B1 | 8/2019 | Chen et al. | |
| 10,431,468 B2 | 10/2019 | deVilliers | |
| 10,595,790 B2 | 3/2020 | Itu | |
| 10,622,233 B2 | 4/2020 | Hooge | |
| 2008/0182344 A1 | 7/2008 | Mueller | |

(Continued)

FOREIGN PATENT DOCUMENTS

WO WO 2021/052712 A1 3/2021

OTHER PUBLICATIONS

Han, S. S., M. Ceiler, S. A. Bidstrup, P. Kohl, and G. May. "Modeling the properties of PECVD silicon dioxide films using optimized back-propagation neural networks." IEEE Transactions on Components, Packaging, and Manufacturing Technology: Part A 17, No. 2 (1994): 174-182. (Year: 1994).*

(Continued)

*Primary Examiner* — Kamran Afshar
*Assistant Examiner* — Simon Fischer Ellis
(74) *Attorney, Agent, or Firm* — Knobbe, Martens, Olson & Bear, LLP (57) ABSTRACT

A method is disclosed for generating a corrective film pattern for reducing wafer bow in a semiconductor wafer fabrication process. The method inputs to a neural network a wafer bow signature for a predetermined semiconductor fabrication step. The neural network generates from the input a corrective film pattern corresponding to the wafer bow signature. The neural network is trained with a training dataset of wafer shape transformations and corresponding corrective film patterns.

9 Claims, 9 Drawing Sheets

(56) References Cited

U.S. PATENT DOCUMENTS

| | | | |
|---|---|---|---|
| 2009/0055176 A1* | 2/2009 | Hu | G10L 15/08 |
| | | | 704/E15.001 |
| 2009/0112489 A1* | 4/2009 | Ghaboussi | E02D 1/022 |
| | | | 73/818 |
| 2014/0365180 A1 | 12/2014 | Lam | |
| 2015/0211836 A1 | 7/2015 | deVilliers | |
| 2016/0283625 A1 | 9/2016 | Vukkadala et al. | |
| 2017/0351952 A1 | 12/2017 | Zhang | |
| 2018/0068859 A1 | 3/2018 | deVilliers | |
| 2018/0068860 A1* | 3/2018 | deVilliers | H01L 21/67115 |
| 2018/0342410 A1 | 11/2018 | Hooge et al. | |
| 2019/0279102 A1* | 9/2019 | Cataltepe | G06V 10/80 |
| 2019/0283218 A1 | 9/2019 | Kang | |
| 2020/0042659 A1 | 2/2020 | Tallman | |
| 2020/0226742 A1* | 7/2020 | Sawlani | H01L 21/67288 |
| 2020/0402252 A1 | 12/2020 | Agarwal et al. | |
| 2021/0012054 A1* | 1/2021 | Adler | H05K 3/4038 |
| 2021/0034961 A1* | 2/2021 | Lovell | G06F 30/20 |
| 2022/0404711 A1* | 12/2022 | Gu | G05B 13/0265 |
| 2022/0405624 A1* | 12/2022 | Takahashi | G06N 7/01 |
| 2022/0415683 A1 | 12/2022 | Stoddard et al. | |
| 2023/0187284 A1 | 6/2023 | Sharma et al. | |
| 2023/0260105 A1 | 8/2023 | Korb et al. | |
| 2023/0326738 A1 | 10/2023 | Schepis et al. | |

OTHER PUBLICATIONS

Yang, Haoyu, Shuhe Li, Yuzhe Ma, Bei Yu, and Evangeline FY Young. "GAN-OPC: Mask optimization with lithography-guided generative adversarial nets." In Proceedings of the 55th Annual Design Automation Conference, pp. 1-6. 2018. (Year: 2018).*

Schoenfeld et al. A U-Net Based Discriminator for Generative Adversarial Networks. Mar. 19, 2021. arXiv:2002.12655v2 [cs.CV].

Brunner, et al., Characterization of Wafer Geometry and Overlay Error on Silicon Wafers with Nonuniform Stress. Journal of Micro/Nanolithography, MEMS, and MOEMS. 2013, p. 043002.

Brunner, et al., Characterization and Mitigation of Overlay Error on Silicon Wafers with Nonuniform Stress. Optical Microlithography XXVII. 2014.

Veeraraghaven, et al. Simulation of Non-Uniform Wafer Geometry and Thin Film Residual Stress on Overlay Errors. Metrology, Inspection, and Process Control for Microlithography XXV. 2011.

Janssen, et al. Celebrating the 100th Anniversary of the Stoney Equation for Film Stress: Developments from Polycrystalline Steel Strips to Single Crystal Silicon Wafers. Thin Solid Films 2009, 517 (6), 1858-1867.

Feng, et al. On the Stoney Formula for a Thin Film/Substrate System With Nonuniform Substrate Thickness. J. Appl. Mech. 2007, 74 (6), 1276-1281.

Pureza, et al. Enhancing Accuracy to Stoney Equation. Appl. Surf. Sci. 2009, 255 (12), 6426-6428.

Ronneberger, et al. U-Net: Convolutional Networks for Biomedical Image Segmentation. May 18, 2015. arXiv:1505.04597 [cs.CV].

Jansson, et al. Singing Voice Separation with Deep U-Net Convolutional Networks; openaccess.city.ac.uk, 2017.

Isola, et al. Image-to-Image Translation with Conditional Adversarial Networks. Nov. 26, 2018. arXiv:1611.07004 [cs.CV].

Goodfellow, et al. Generative Adversarial Networks. Jun. 10, 2014. arXiv:1406.2661 [stat.ML].

Kingma, et al. Auto-Encoding Variational Bayes. May 1, 2014. arXiv:1312.6114 [stat.ML].

Rezende, et al. Stochastic Backpropagation and Approximate Inference in Deep Generative Models. May 30, 2014. arXiv:1401.4082 [stat.ML].

Kohl, et al. A Probabilistic U-Net for Segmentation of Ambiguous Images. Jan. 29, 2019. arXiv:1806.05034 [cs.CV].

International Search Report and Written Opinion for PCT Application No. PCT/US2025/017356 dated May 12, 2025 in 12 pages.

De Maesschalck, et al., The mahalanobis distance. Chemometrics and intelligent laboratory systems, 50(1), 1-18, (2000).

Rudner, et al., Function-space regularization in neural networks: A probabilistic perspective. In International Conference on Machine Learning (p. 29275-29290), (Jul. 2023).

Ledoit, et al., A well-conditioned estimator for large-dimensional covariance matrices. Journal of multivariate analysis, 88(2), 365-411 (2004).

Hu, et al. A Review on Zernike Coefficient-Solving Algorithms (CSAs) Used for Integrated Optomechanical Analysis (IOA). In Photonics (vol. 10, No. 2, p. 177). MDPI. (Feb. 2023).

Extended European Search Report for EP Application No. 22833915.6 dated Jul. 2, 2025 in 7 pages.

Selvanayagam Cheryl et al: "Inverse Design of Substrate from Warpage Surrogate Model Using Global Optimisation Algorithms in Ultra-Thin Packages", 2020 IEEE 70th Electronic Components and Technology Conference (ECTC), IEEE, Jun. 3, 2020 (Jun. 3, 2020), pp. 2309-2316.

Wu Wen-Chun et al: "Development of Artificial Neural Network and Topology Reconstruction Schemes for Fan-Out Wafer Warpage Analysis", 2021 IEEE 71st Electronic Components and Technology Conference (ECTC), IEEE, Jun. 1, 2021 (Jun. 1, 2021), pp. 1450-1456.

* cited by examiner

METHOD FOR DETERMINING CORRECTIVE FILM PATTERN TO REDUCE SEMICONDUCTOR WAFER BOW

FIELD OF THE INVENTION

The present invention relates generally to semiconductor wafer fabrication methods. More specifically, it relates to techniques for reducing wafer bow.

BACKGROUND OF THE INVENTION

In semiconductor manufacturing, complex structures are fabricated using sequences of thin film deposition, photolithography, and etching. Complex structures are fabricated using lithography and etching masks with small feature sizes and repeating these steps many times for various materials. In each processing step, the lithography and etching masks must be precisely aligned with an absolute coordinate system for each device on a wafer. As device dimensions get smaller, the tolerance for spatial deviations in mask alignment becomes stricter. If the spatial offset (or "overlay error") in two or more processing steps is too great, the device will not work. One phenomenon that leads to overlay error is wafer bowing and warping during processing [1-3]. Wafer bow occurs when distinct material films with unequal thermal expansion coefficients undergo a temperature change during processing. In cases with many different thin film materials and complex device patterns, the wafer bow signatures can be complex and the in-plane distortion that arises due to the bow signature is not easily determined [1,4].

Applying a corrective film to reduce or eliminate wafer bow is one route to minimize overlay error and increase device yield. One technical challenge that arises with this solution is deciding which corrective film pattern to apply to the wafer that will effectively remove bow signature and adequately reduce overlay error. The wafer bow problem can be modeled as a linear elasticity problem and solved using a numerical approach (using finite element method), yet the calculation time for this approach is too long to be practical in an on-line semiconductor fabrication environment.

The topic of reducing wafer bow in semiconductor manufacturing is quite broad and there have been many patented inventions related to specific materials and process alterations to control or reduce wafer bow [5-7]. This class of inventions relate to the physical materials and processes used in the fab, and do not involve modeling, machine learning (ML), or software components.

The concept of adding a silicon nitride film onto a semiconductor wafer to reduce stress has been practiced and exposed for more than two decades, as demonstrated by a 1998 Micron patent [8]. In recent years, Tokyo Electron has protected many inventions relating to correcting wafer bow and minimizing overlay error with various technologies [9-13]. Perhaps the most relevant patent is the patent on the Austin group's solution to the correction pattern optimization problem [9]. Hooge et al. discuss the printing of a special pattern of a corrective film on the backside of a semiconductor wafer with the goal of reducing wafer bow, flattening a wafer, and minimizing overlay error [9]. The authors describe three distinct systems that can be used to determine the best backside pattern to apply. In each of these systems, a "pixel sum" approach is used, which determines the stress influence of a single pixel then sums to total stress correction of all pixels to get global stress correction (using some empirical correction factors) [9]. In one system (shown in their FIG. 2), they use finite element method (FEM) to determine equibiaxial stress of a single pixel, yet they do not employ a holistic FEM approach as described below. Further, there is no surrogate model or machine learning component to their invention. Other Tokyo Electron patents regarding similar applications include a substrate holding apparatus to improve bow metrology [11], location-specific tuning of stress to control overlay (general concept) [12], and a method to correct wafer bow and overlay using spatially patterned particle bombardment [13].

Additionally, the idea of a surrogate machine learning model to enhance or to speed up a first-principles model is not novel and has been applied to other problem domains in various industries [14-17].

Finally, the concept of an autonomous surrogate model framework has been patented [18] and mentions use in the semiconductor domain. However, this relates to a framework of generation of surrogate models, and it does not teach or suggest a process to use a surrogate model to optimize a semiconductor process step.

BRIEF SUMMARY OF THE INVENTION

The invention described below overcomes this technical challenge and provides a solution to the wafer bow correction problem by using a machine learning surrogate model approach. Our surrogate model successfully suggests a corrective film pattern to reverse a generic wafer bow signature with computation time of about three orders of magnitude less than the finite element method approach. The details of our solution and an overview of related work is presented below.

In one aspect, the invention provides a method for generating a corrective film pattern for reducing wafer bow in a semiconductor wafer fabrication process, the method comprising: inputting to a neural network a wafer bow signature for a predetermined semiconductor fabrication step; generating by the neural network a corrective film pattern corresponding to the wafer bow signature; wherein the neural network is trained with a training dataset of wafer shape transformations and corresponding corrective film patterns. The training dataset may be generated using a simulation to compute the corrective film patterns from the wafer shape transformations for the predetermined semiconductor fabrication step. The training dataset may be generated by experimentally determining the corrective film patterns corresponding to the wafer shape transformations. The training dataset may be generated using a finite element method to solve a linear elasticity problem and using an optimization framework to select the wafer shape transformations that minimize a cost function.

The method may further include performing active learning feedback to refine the neural network. The neural network may be implemented as a convolutional U-Net, a Zernike convolutional neural network, a conditional variational autoencoder, or as a conditional generative adversarial network. The conditional generative adversarial network may include a generator implemented as a U-Net with skip connections or a discriminator implemented as a convolutional classifier.

BRIEF DESCRIPTION OF THE SEVERAL VIEWS OF THE DRAWINGS

FIGS. 1A, 1B, 1C show processing flow diagrams of an embodiment of the invention. The different arrow styles indicate different information flow. Thick solid arrows indicate the movement of physical wafers in a semiconductor fab. The thin solid arrows indicate transfer of 2D array data, such as datasets of film patterns and wafer shape transformations. The dashed arrows indicate transfer of model parameter information, such as Zernike coefficients or machine learning model weights and biases.

DETAILED DESCRIPTION OF THE INVENTION 2.3 Definitions of Terms

Wafer bow signature: The height (z) of a semiconductor wafer for each horizontal position on the wafer. A wafer is bowed due to various stresses accumulating during fabrication. The coordinate system to define a wafer bow signature is standardized to give a unique description. First, raw shape metrology data is obtained, which defines the z position across the wafer with center at (x, y)=(0, 0). Then, the z data is fit using zernike polynomials (as described below), then tilt is removed by subtracting the $Z_1^1$ and $Z_1^{-1}$ modes from the shape. Then, minimum z is subtracted so that all z values are positive with minimum height of 0. Throughout this document we use "wafer bow signature" to refer to the wafer bow prior to deposition of a corrective film pattern.

Corrective film pattern: A corrective film pattern is a pattern of a corrective film applied onto a wafer in order to modify the wafer bow signature. A pattern is achieved by deposition of a uniformly thick film, then selectively etching away many small areas of the film, leaving parts of the original film in place. Because the density of the etched away areas of the pattern can vary across the surface, the average percent area covered by the film in localized regions is a function of position on the surface of the film. For example, a 1 mm square region in one position on the surface may have 50% coverage by etching away 20 μm squares within the region to form a checkerboard where half of the 20 μm squares are etched away and half remain. Another 1 mm square region in another position on the surface may have 75% coverage by etching away a quarter of the squares.

Wafer shape transformation: The desired change in wafer bow signature due to deposition for a corrective film pattern. Typically, the wafer shape transformation is the shape transformation that will make the wafer flat, which is the negative of the wafer bow signature prior to deposition of a corrective film pattern. Another possibility is specific wafer shape transformation to reduce higher order bow and/or minimize overlay error directly could be employed.

Residual Bow: The height (z) of a semiconductor wafer for each horizontal position on the wafer after deposition of a corrective film pattern to modulate the wafer bow. The data preprocess to obtain a unique shape is analogous to that described for wafer bow signature.

Linear elasticity problem: A structural analysis problem where the linear elasticity mathematical model is assumed, i.e. strain (deformation) of an elastic object is proportional to applied stress. An elastic object is an object that would return to its original shape if the stress was removed (in contrast to yielding).

Neural network: a machine learning model formed by an arrangement of nodes and activation functions that can learn a nonlinear function between inputs and outputs (see Section 3.3)

Finite element method: A numerical approximation method for solving partial differential equations for 2D and 3D problems used in many engineering domains (see Section 3.2)

Optimization framework: a strategy to find a solution for the inverse of an FEM simulation by parameterizing a corrective film pattern with Zernike polynomials (see Section 3.4), and using an optimization algorithm to identify a suitable film pattern (see Section 4.3)

Active learning feedback: Using a machine learning model to choose a batch of unlabeled data points that would give maximum improvement to the neural network if they were labeled. Then labeling these data points (either using a simulator or experiments), and providing results to the neural network for improvement (see Section 4.6)

3. Theoretical Background 3.1 Linear Elasticity and Wafer Bow

Apply some force to a wafer and it will deform, and the deformation will depend on the direction and magnitude of the applied forces as well as the geometry and material properties of the wafer. If we limit our consideration to infinitesimal strains and assume a linear relationship between stress and strain, then the wafer constitutive equation is Hooke's law:

$$\sigma = C\epsilon \quad (1)$$

where $\sigma$ is the Cauchy stress tensor, $\epsilon$ is the strain tensor and C is the fourth-order stiffness tensor. The strain-displacement relation is expressed by $$\epsilon = \frac{1}{2}[\nabla u + (\nabla u)^T] \quad (2)$$

where u is the displacement vector describing the change in position due to stress. If the wafer is at steady-state, the equation of motion is given by $$\nabla \cdot \sigma + F = 0 \quad (3)$$

where F is the body force per unit volume. For isotropic materials, the constitutive equation relating stress $\sigma$ and strain $\epsilon$ simplifies and is dependent on two scalar material properties, the Young's modulus E and the Poisson's ratio v. This is a linear, second order, elliptic partial differential equation in three dimensions, and there exists an analytical solution for the wafer bow problem only in very simple scenarios, such as the simple scenario where the Stoney equation is valid.

The Stoney equation [19] makes the following assumptions:
- the film and substrate have the same radius and uniform thickness, with $h_f \ll h_s \ll R$
- strains and rotations are infinitesimal
- the film and substrate are homogeneous, isotropic, and linearly elastic
- the film stress states are in-plane isotropic or equibiaxial
- the system's curvature components are equibiaxial
- all nonzero stress and curvature components are constant across the systems surface With these assumptions, the solution to the linear elasticity problem yields the Stoney equation, which relates the magnitude of the stress in the corrective film with the system curvature from deformation:

$$\sigma^f = \frac{E_s h_s^2 \kappa}{6 h_f (1 - v_s)} \tag{4}$$

where $\sigma^f$ is the film stress, $E_s$ is the Young's modulus of the substrate, $v_s$ is the Poisson's ratio of the substrate, $h_f$ and $h_s$ are the thickness of the film and substrate respectively, and $\kappa$ is the curvature of the system. Several more sophisticated extensions to the Stoney model that relax some of the above assumptions have been published [4,19,20], yet none are sophisticated enough to be valid for the real wafer bow problem with a non-uniform film. Although the Stoney equation and its extensions offer convenient analytical tools to build a qualitative view on how a film will stress and bow a wafer substrate, the real wafer bow problem violates many of the assumptions required for these models to be valid, and thus a computational approach to approximate the solution to the above partial differential equation is required.

3.2 Solving Linear Elasticity Problem with FEM

Since we cannot solve the above partial differential equation for the sophisticated case of the bowed wafer problem, we resort to computational methods to produce an approximate solution. Finite Element Method (FEM) is a powerful tool for solving partial differential equations in three dimensions for an arbitrary domain shape. Here we briefly review the theory behind the FEM approximate solution. Consider the basic form of our partial differential equation above $$-\nabla \cdot (c \nabla u) = f \text{ on domain } \Omega \tag{5}$$

We now multiply by test function v and integrate over domain $\Omega$ to convert this differential (strong) form into an integral (weak) form $$\int_\Omega (-\nabla \cdot (c \nabla u) - f) v \, d\Omega = 0 \quad \forall v \tag{6}$$

We further specify that the problem has two boundary conditions, a Dirichlet boundary condition $u = r$ on $\partial \Omega_D$ and a Neumann condition on the boundary $\partial \Omega_N$. By applying Green's rule (integration by parts) and the boundary conditions we can rewrite equation (6) as $$\int_\Omega (c \nabla u \cdot \nabla v) d\Omega + \int_{\partial \Omega} (-c \nabla u) \cdot n v \, d\partial \Omega - \int_\Omega f v \, d\Omega = 0 \quad \forall v \tag{7}$$

The test function v and solution u belong to Hilbert spaces (an infinite dimensional function space), and an important component of the weak formulation is that it must hold for all test functions in the Hilbert space. Following the Galerkin method formulation, we assume the solution u belongs to the same Hilbert space as the test functions, then we look for an approximate solution $u_h \approx u$ in a finite-dimensional subspace of the Hilbert space. Our approximate solution can be expressed as a linear combination of a set of basis functions $\phi_i$ in that subspace $$u_h = \Sigma_i u_i \phi_i \tag{8}$$

The discretized version of the above integral equation becomes $$\Sigma_i u_i \int_\Omega (c \nabla \phi_i \cdot \nabla \phi_j) d\Omega + \Sigma_i \int_{\partial \Omega} (-c u_i \nabla \phi_i) \cdot n \phi_j d\partial \Omega - \int_\Omega f \Sigma_i u_i \phi_j d\Omega = 0 \tag{9}$$

for every test function $\phi_j$. With n number of test functions, there are n unknown coefficients $u_i$ needed to attain the approximate solution $u_h$. After the system is discretized and boundary conditions are applied, the above equation simplifies to $Au_i = b$, where A is an n×n matrix and b is a vector with length n, where both are determined by simplifying the discretized equation (9) with n test functions and n $u_i$ coefficients. The $Au_i = b$ form can be solved with an appropriate solver for linear or non-linear problems.

In summary, finite element analysis allows us to take a system governed by a partial differential equation (here linear elasticity in three dimensions), then discretize the problem into elements to find an approximate solution by solving a linear set of equations. The finer the mesh, the greater the number of basis functions and the closer the approximate solution will be to the real solution.

3.3 Neural Networks Background

Neural Networks are a general framework that arrange units or nodes in a pre-defined architecture to create a complex non-linear relationship between inputs and outputs. Each neural network has both an input and output layer where the layer shape is dictated by the input and output type. The most common example of a neural network is a fully connected, feed-forward network with hidden layers in addition to input and output layers (called a multi-layer perceptron). Values at each node are propagated to nodes in subsequent layers with an activation function that is parameterized with weights and biases. The hidden layers are not directly connected to inputs and outputs but are included to automatically extract features from the input layer which aid in output determination. In the process of training, a neural network is exposed to many labeled examples, or input examples where the correct output is known. In a training iteration, gradient calculations and backpropagation modulate the weights and biases of each node to improve a predetermined loss function. After training, the weights and biases typically remain fixed, and the network can perform inference on unseen data using the non-linear function learned in training.

Certain input and output types benefit from more sophisticated network architectures than the simple multi-layer perceptron. For example, with a two-dimensional array of input data (such as an image), convolutions are typically used to extract features. In a convolutional neural network, filters are used to transform 2D input data into feature maps with various channels. Typically, multiple convolution layers are employed to make feature maps from preceding feature maps, and often a fully connected output architecture is used to determine outputs from the final feature map layer. A convolutional neural network can be thought of as a regularized multi-layer perceptron; instead of each input pixel being fully connected to every node in the next layer, convolutions are used to extract features from an arrangement of the pixel with neighboring pixels. The concepts from a multi-layer perceptron and convolutional neural networks provide the framework for the more sophisticated neural network architectures employed in this work.

3.4 Zernike Polynomials

Zernike polynomials are a sequence of polynomials used to describe surfaces in a circular domain, developed originally for applications in optics [21]. There are even and odd Zernike polynomials, where even polynomials are given by $$Z_n^m(r,\theta)=R_n^m(r)\cos(m\,\theta) \tag{10}$$

and odd Zernike polynomials are given by $$Z_n^{-m}(r,\theta)=R_n^m(r)\sin(m\,\theta) \tag{11}$$

where $$R_n^m(r) = \Sigma_{k=0}^{\frac{n-m}{2}} \frac{(-1)^k(n-k)!}{k!\left(\frac{n+m}{2}-k\right)!\left(\frac{n-m}{2}-k\right)!} r^{n-2k}, \tag{12}$$

r is the radial position on a unit disk ($0 \leq r \leq 1$), $\theta$ is the azimuthal angle, m and n are non-negative integers unique to a particular Zernike polynomial and $R_n^m(1)=1$. Here, we utilize Zernike polynomials to parameterize a general wafer shape to describe wafer bow signatures, desired wafer shape transformations, or residual bow. We define a general wafer shape as $$u_z(r,\theta)=\Sigma_{a=0}^N c^a Z_n^m \tag{13}$$

where a is the index of each Zernike polynomial, i.e., a=0, 1, 2, 3, 4, 5 . . . correspond to (n, m)=(0, 0), (−1,1), (1,1), (−2,2), (0,2), (2,2) . . . respectively. The coefficient $c_a$ represents a Zernike coefficient for each polynomial. Thus, an arbitrary wafer shape can be represented using the above general equation, and as N becomes larger the error between the true shape and the Zernike representation will decrease. Using the Zernike representation, a general wafer shape can be expressed in a parameterized way with N coefficients $c_a$. Generally, wafer shapes are smooth, and a sufficient shape approximation can be obtained with N=20-50.

4. Description of Preferred Embodiments

4.1 High Level Overview

Embodiments of the invention provide a process utilizing a finite element method (FEM) along with machine learning to optimize the corrective film pattern with a computation time relevant for on-line deployment. As outlined in FIG. 1A, an FEM model solver 100 is built to solve the linear elasticity problem for the appropriate wafer and film geometry used in a particular semiconductor fabrication process step. A corrective film pattern optimization framework 102 is built on top of this FEM model solver 100 to optimize for the corrective film pattern that results in the greatest reduction in wafer bow. This FEM model and optimization framework are used to generate the corrective film patterns 106 from a dataset of corresponding desired wafer shape transformations 104. The dataset generation is typically accomplished by a simulation engineer using standard central processing unit. Dataset generation can be parallelized if desired.

Figure 1A:
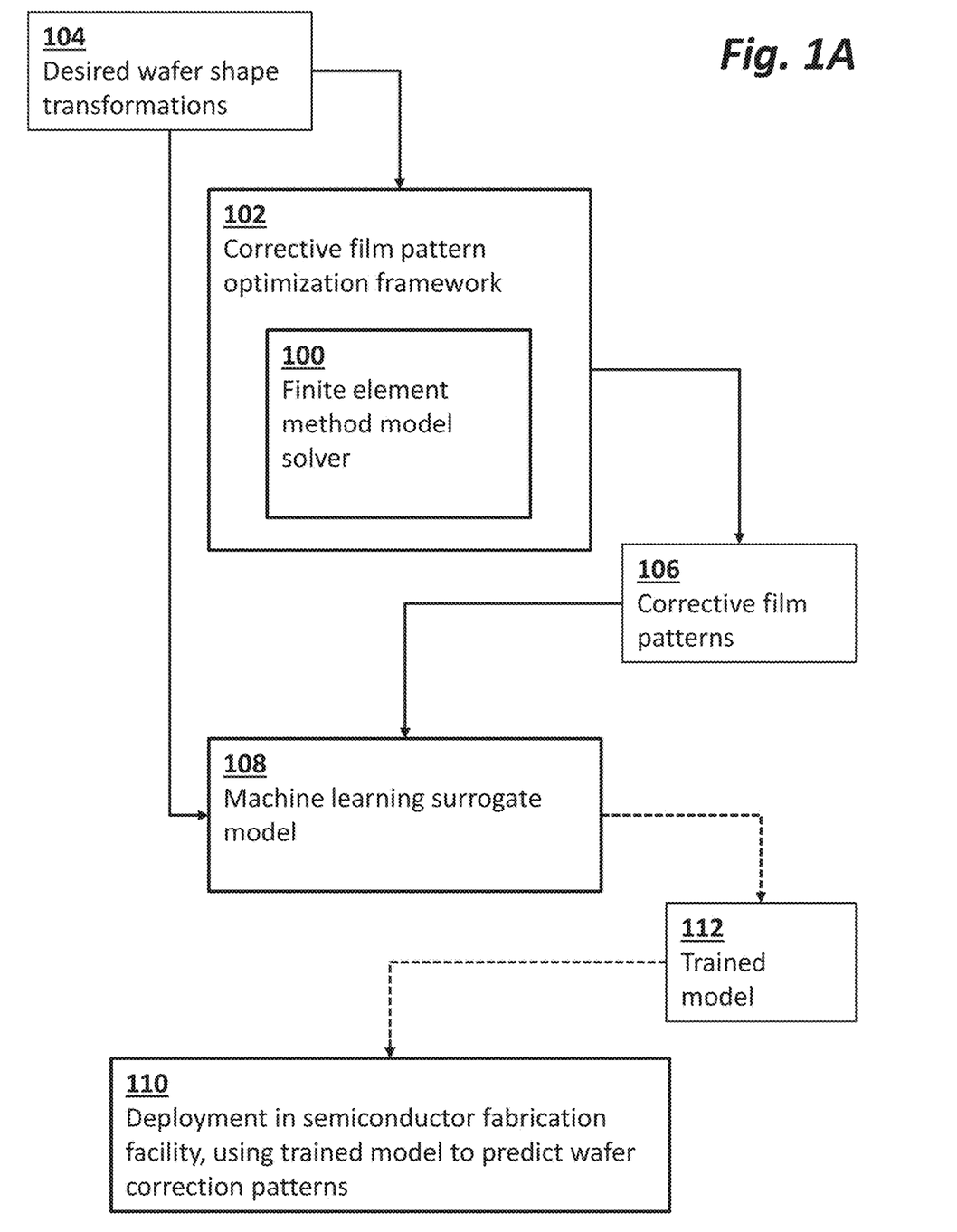

The dataset 106 is used together with the dataset of desired wafer shape transformations 104 to train a neural network in a machine learning surrogate model 108. This is typically performed by a machine learning engineer. They will also package the model for deployment in production. Training the surrogate model will benefit from graphical processing unit acceleration, so hardware that supports deep learning with graphical processing unit is recommended. The surrogate model 108 defines the general model architecture, layer shapes, and hyperparameters, while the trained model 112 represents an instance of the surrogate model with the specific model weights that minimize the difference between predicted and actual wafer shape transformations (for the forward model) or minimize the residual wafer bow (for the compiled model).

This trained model 112 is then delivered to and deployed in a semiconductor fabrication facility 110 where it is used to perform the same optimization task as the optimization framework, but in a small fraction of the computation time. Typically, a process engineer will use the packaged model in collaboration with the machine learning engineer. The computing system used for this last step should include hardware that can integrate with the tools in the fab and have graphical processing unit capabilities for the retraining steps. Interested parties include companies that run semiconductor fabs, companies that provide equipment to semiconductor fabs, and companies that provide software to any of the equipment or fab companies.

If desired, the trained model 112 may be retrained during deployment using a validation dataset of physical wafers (not simulated) to learn any data distribution shift between the simulated and actual wafer shape transformations. A specialized active learning approach can be used to optimally choose validation sample points for this retraining step. Finally, an on-line retraining scheme can be used to further reduce wafer bow or overlay error and account for any data drift.

We now turn to the details of the finite element solver 100 and the corrective film pattern optimization framework 102. These steps are shown in more detail in FIG. 1B.

4.2 FEM Simulations for Wafer Bow

Figure 1B:
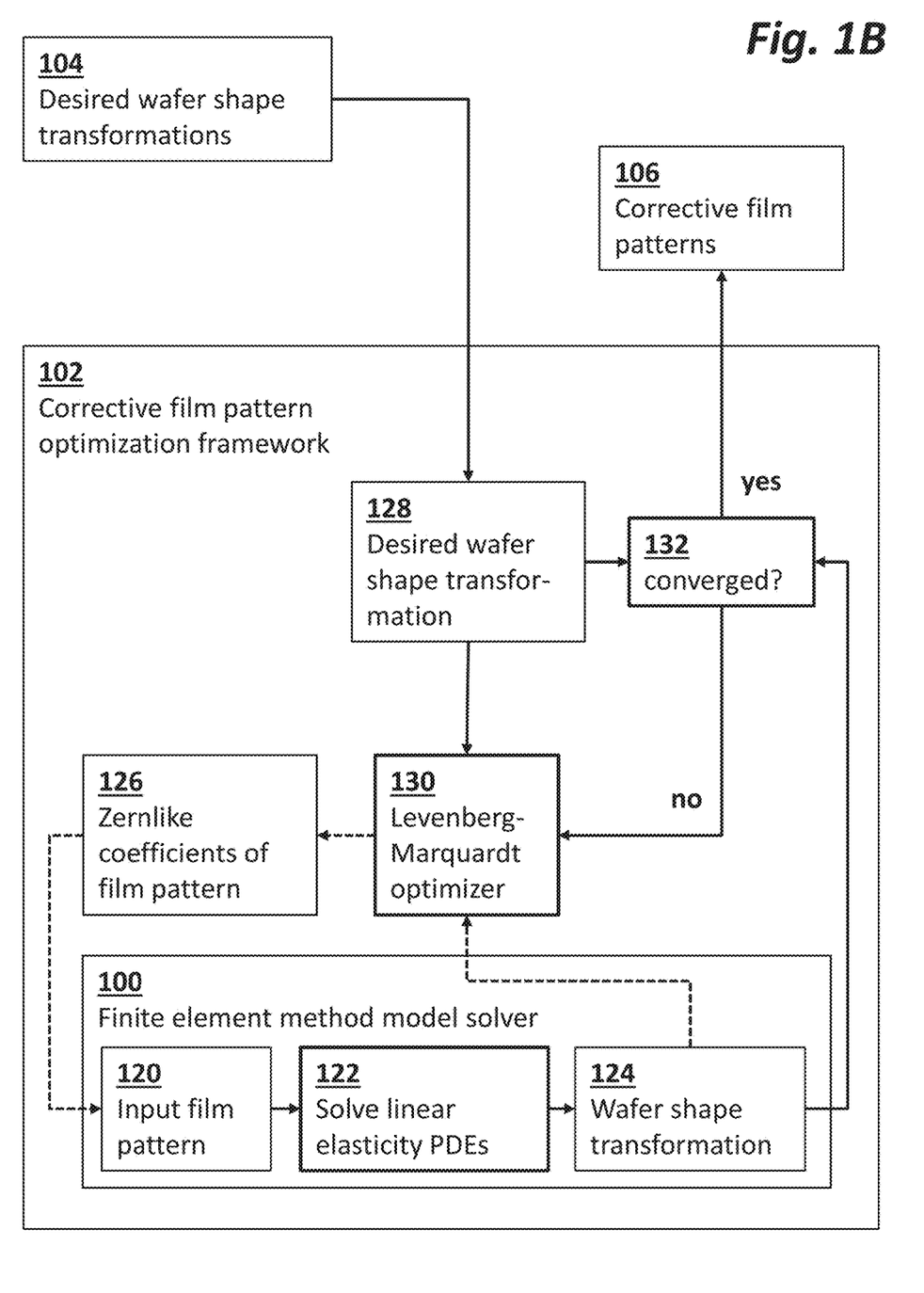

The linear elasticity partial differential system of equations is solved using FEM. The role of the FEM model solver 100 is to take a non-uniform film pattern 120, solve the linear elasticity partial differential equations 122 to determine the stresses that applying such a corrective film has on a wafer, then determine the wafer shape transformation 124 undergone by the wafer due to those stresses. The wafer and corrective film are modeled as a disk with non-uniform film, and the film stress is modeled by defining a temperature change and setting the coefficient of thermal expansion offset by calibrating to known uniform film stress using Stoney's equation. The maximum film thickness in the simulation is set using the full thickness of the printed corrective film, and the thickness pattern of corrective film across the wafer in the simulation is defined to replicate the percent coverage pattern of printed corrective film. The film is discretized using a matrix and a smooth cubic interpolation function is used on this discretized pattern to determine precise thickness at each node in FEM simulation. The matrix dimensions can be chosen based on the desired spatial resolution; most likely dimensions on the order of 100-1000 will be appropriate.

As discussed above, in finite element analysis (FEA) an approximate solution to a partial differential equation is obtained by discretizing the domain into finite elements. The mesh is obtained using Delaunay triangulation, and second order (quadratic) elements are used (nodes are located at both vertices and edge midpoints of each tetrahedra). The target maximum and minimum element lengths are set to obtain a structure with ~10,000 elements. The number of elements can be increased to reduce the approximation error up until the memory constraint of the hardware used.

Figure 2:
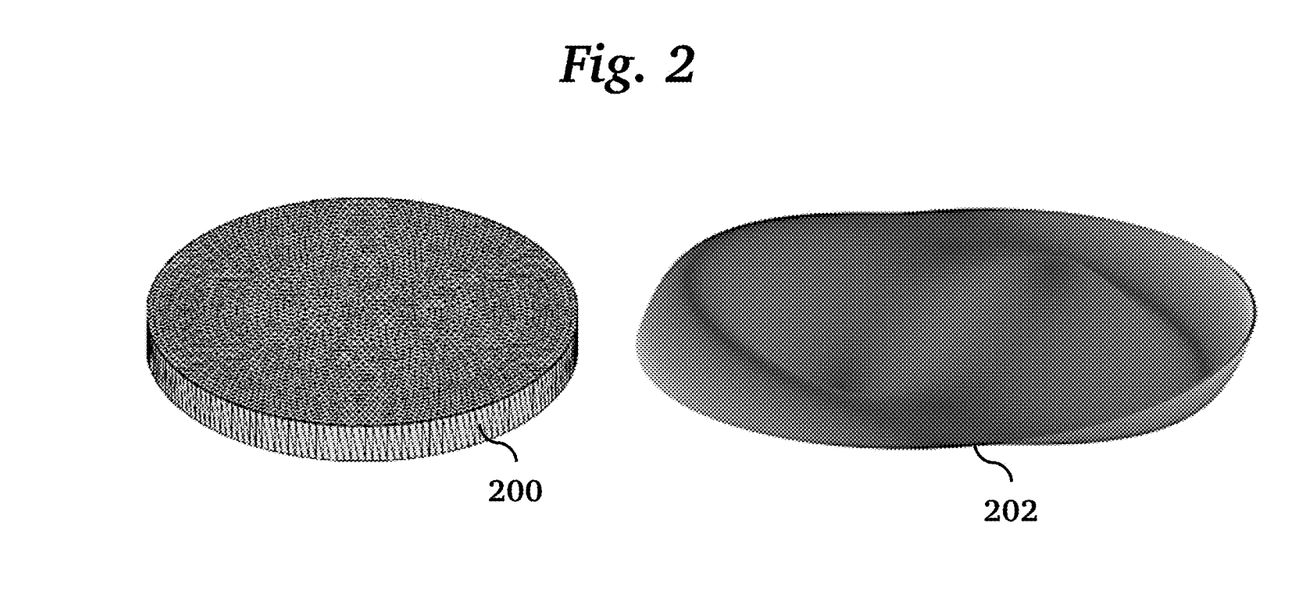
FIG. 2 illustrates the linear elasticity problem as solved using FEM according to an embodiment of the invention.

FIG. 2 illustrates a meshed representation 200 of a wafer disk with a thin film coating. Also shown is a plot of in-plane displacement (the magnitude of the position change in the z=0 plane) as a function of position 202 for an example wafer bow signature (Z exaggeration by 1000×).

The FEA system is specified using the partial differential equation system described in section 3.1. A single Dirichlet boundary condition is provided at a point $u_x(0,0)=0$; $u_y(0,0)=0$; $u_z(0,0)=0$, and the Neumann condition is determined from the thermal boundary load (by defining a thermal expansion coefficient offset between the wafer and corrective film). A nonlinear solver employing the Gauss-Newton iteration scheme solves the FEM system to give the approximate result. Note that specifying only a point Dirichlet condition leads to an infinite solution set because the solution could be tilted in an arbitrary direction. We account for this and provide a unique solution by tilting the solution until the $c_a$ coefficients for the $Z_1^{-1}$ and $Z_1^{1}$ modes are precisely zero.

The FEM model incorporates knowledge from the specific silicon wafer used and information about the corrective film. The stiffness tensor C uses published material properties for the silicon crystal structure of interest, (e.g. c-Si(100) or c-Si(111)) [4]. Note that the wafer crystal structure is cubic and thus has anisotropic structural behavior, and the stiffness tensor can be described with three parameters (rather than simply the elastic modulus and Poisson's ratio as in isotropic materials). The wafer dimensions (thickness and radius) are specified based on the wafer used in the process of interest. Also, the corrective film stress value is specified using the corrective film of interest in the process. Typically, the stress value is calibrated using a simple experiment with deposition of a uniform film at several known thicknesses and defining the temperature difference-coefficient of thermal expansion product that achieves the measured wafer bow. Finally, the printable area is specified using the limitations of the corrective film deposition tool (typically there is a region near the perimeter of the wafer where it is not feasible to deposit corrective film).

4.3 Corrective Film Pattern Optimization Framework

Figure 3:
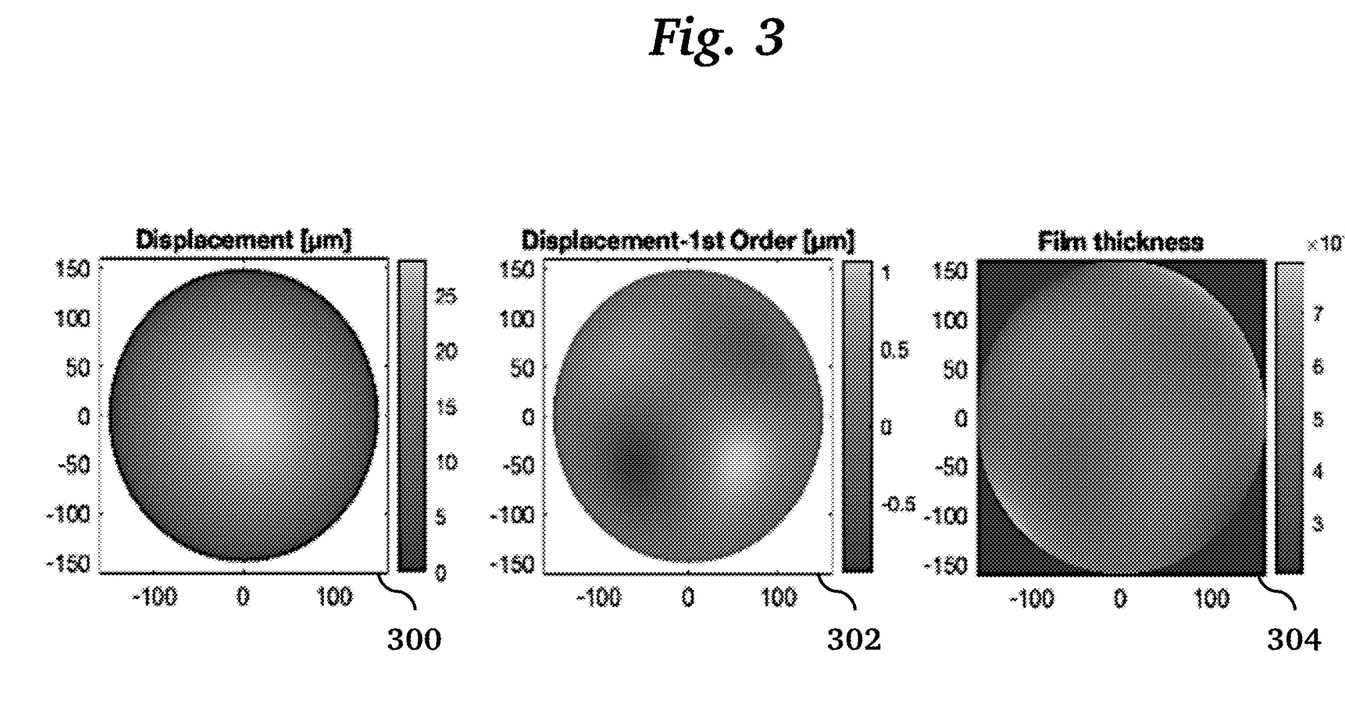
FIG. 3 shows example results from film pattern optimization according to an embodiment of the invention.

The corrective film pattern optimization framework 102 is built on top of the FEM solver 100 as shown in FIG. 1B. The optimization framework takes a dataset of wafer shapes 104 as input. For each desired wafer shape transformation 128 in dataset 104, the optimization framework finds the best corrective film pattern (parameterized by Zernike coefficients 126) as predicted by the FEM solver 100 that will achieve this shape transformation. In this way, the optimization framework generates from the dataset 104 of wafer shape transformations a dataset 106 of corresponding corrective film patterns. The desired wafer shape transformation 128 is typically the transformation that will minimize total wafer bow (negative of the wafer bow signature prior to corrective film deposition), or a shape transformation known to minimize overlay error. The corrective film pattern is parameterized using a defined number of Zernike polynomials 126, where the $c_a$ coefficients are the parameters defining the corrective film pattern. The framework checks in block 132 if the current predicted wafer shape transformation 124 from the FEM solver 100 has converged sufficiently close to the desired shape transformation 128. The cost function to minimize during the optimization is preferably defined as the absolute difference between the desired shape transformation 128 and the shape transformation achieved with the predicted wafer shape transformation 124. The Zernike coefficients input to the FEM solver 100 are optimized using the Levenburg-Marquardt algorithm 130. After each iteration of the algorithm, the resulting wafer shape transformation difference cost function is evaluated using the present film pattern. If the cost function has converged within acceptable criteria, the optimizer stops and the current film pattern 126 is saved in the dataset of corrective film patterns 106, with an index corresponding to a wafer shape in 104. Otherwise, the Zernike coefficients are modified as dictated by the Levenberg-Marquardt algorithm and the optimizer continues. An example result is presented in FIG. 3, which shows an initial desired wafer shape transformation 300, input wafer shape transformation with first order bow component subtracted 302, and film pattern solution returned by film pattern optimization 304.

4.4 Training Dataset Generation

The optimization framework 102 is one strategy to generate a dataset that is used to train the surrogate model 108. More generally, the training dataset can be a) generated from real wafer measurements, b) generated from FEM wafer bow simulations, and/or c) generated using the corrective film optimization framework 102. For (a) and (b), a list of film patterns is generated, where the film patterns could be generated randomly using a Zernike coefficient basis and could have some bias towards the film patterns most likely to be employed during production. The advantage of (a) is that the data distribution will more closely resemble that of production. However, obtaining a large enough dataset to train the deep surrogate model from scratch using only experimental data may be infeasible, so strategy (b) may be preferred.

Dataset generation strategies (a) and (b) have the disadvantage of not enumerating the space of possible wafer shape transformations directly; instead the possibilities are sampled in "inverse space", or in the film pattern space. Strategy c) allows desired wafer shape transformations to be specified directly, which could also be accomplished using a random distribution of Zernike coefficients with bias toward the shape transformations most likely to be required in production. If 20 Zernike polynomials are used and the Levenberg-Marquardt algorithm takes on average 10 iterations to converge, strategy c) will take ~200 times as long to generate a dataset of the same size as strategy b).

Figure 4:
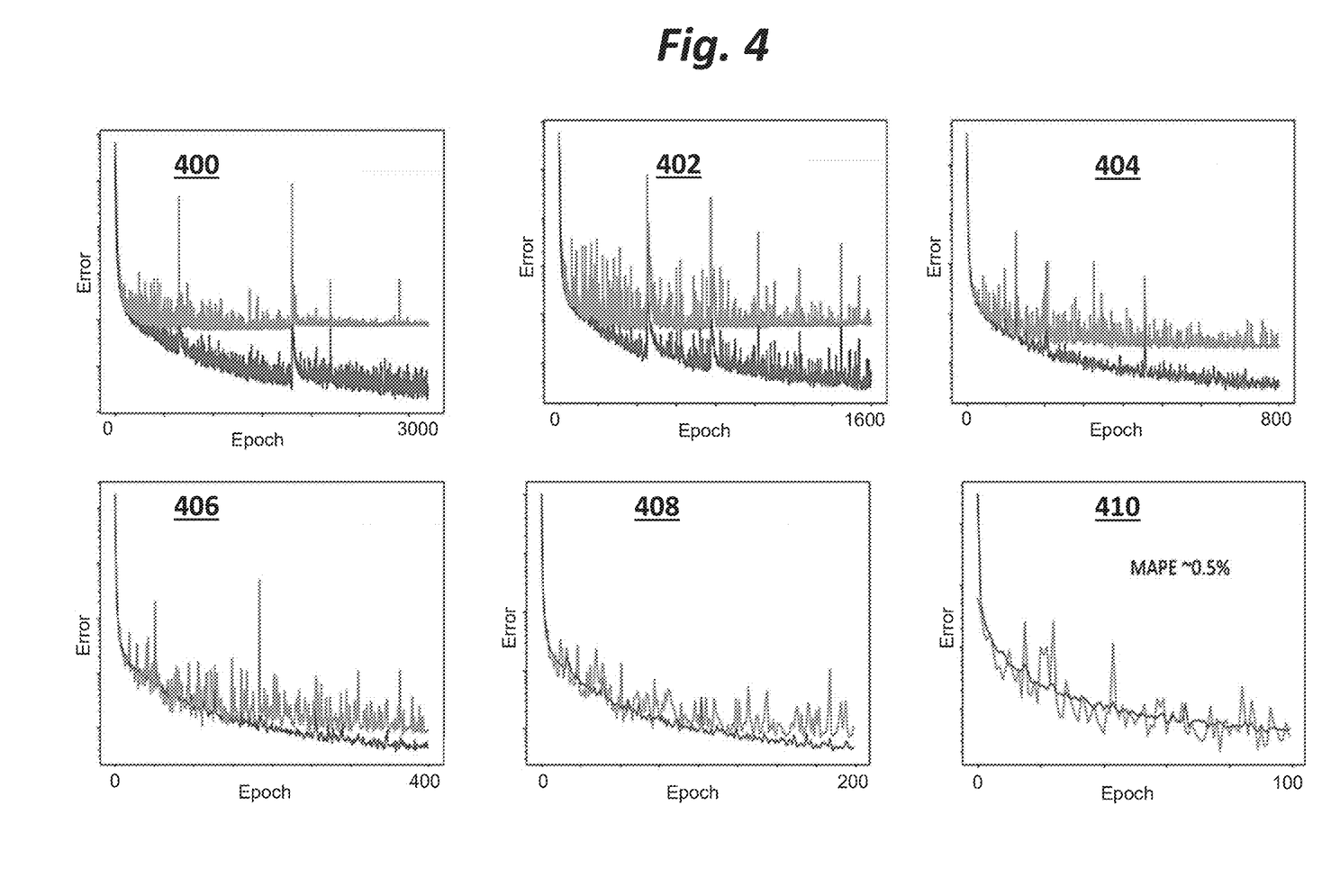
FIG. 4 shows the impact of training dataset size on the validation error according to an embodiment of the invention.

A train-validation-test split strategy may be used to estimate the performance of the surrogate model on unseen data. We performed studies to examine how our surrogate model validation error depends on dataset size to understand the scale of data required to train this class of model. Results for the forward model (predicting wafer bow from film pattern) are shown in FIG. 4. Graphs 400, 402, 404, 406, 408, 410 show the validation error vs epoch for training sizes of 125, 250, 500, 1000, 2000, 4000, respectively. For this task, a training dataset of ~4000 allows for a mean absolute percentage error of less than 1%, while the surrogate model overfits to the training data when a dataset size of <1000 is used. The train-validation strategy gives confidence that the model will generalize well to unseen data. However, the training dataset should be chosen with care such that all examples expected to be observed in production will come from the same distribution. If the training set contains wafers with first order bow of 100-500 μm and maximum absolute higher order bow of 0-30 μm, then it would perform well on wafer examples within the ranges (even if the exact shape has not been observed previously), yet it would likely perform poorly on corrections for wafers that have bow signatures that fall well outside of these ranges.

In practice, a dataset generation strategy combining all the above approaches may be preferable. A dataset containing corrective film patterns and corresponding wafer shape transformations from the simulation (either in strategy b or c) can be used to initially train the surrogate model from scratch. Then, a smaller "validation dataset" of real wafers can be used to understand the differences between the real and simulated scenarios. More details on how the validation dataset can be chosen to maximize performance for a limited dataset are provided in section 4.6.1.

4.5 Machine Learning Surrogate Model

Figure 1C:
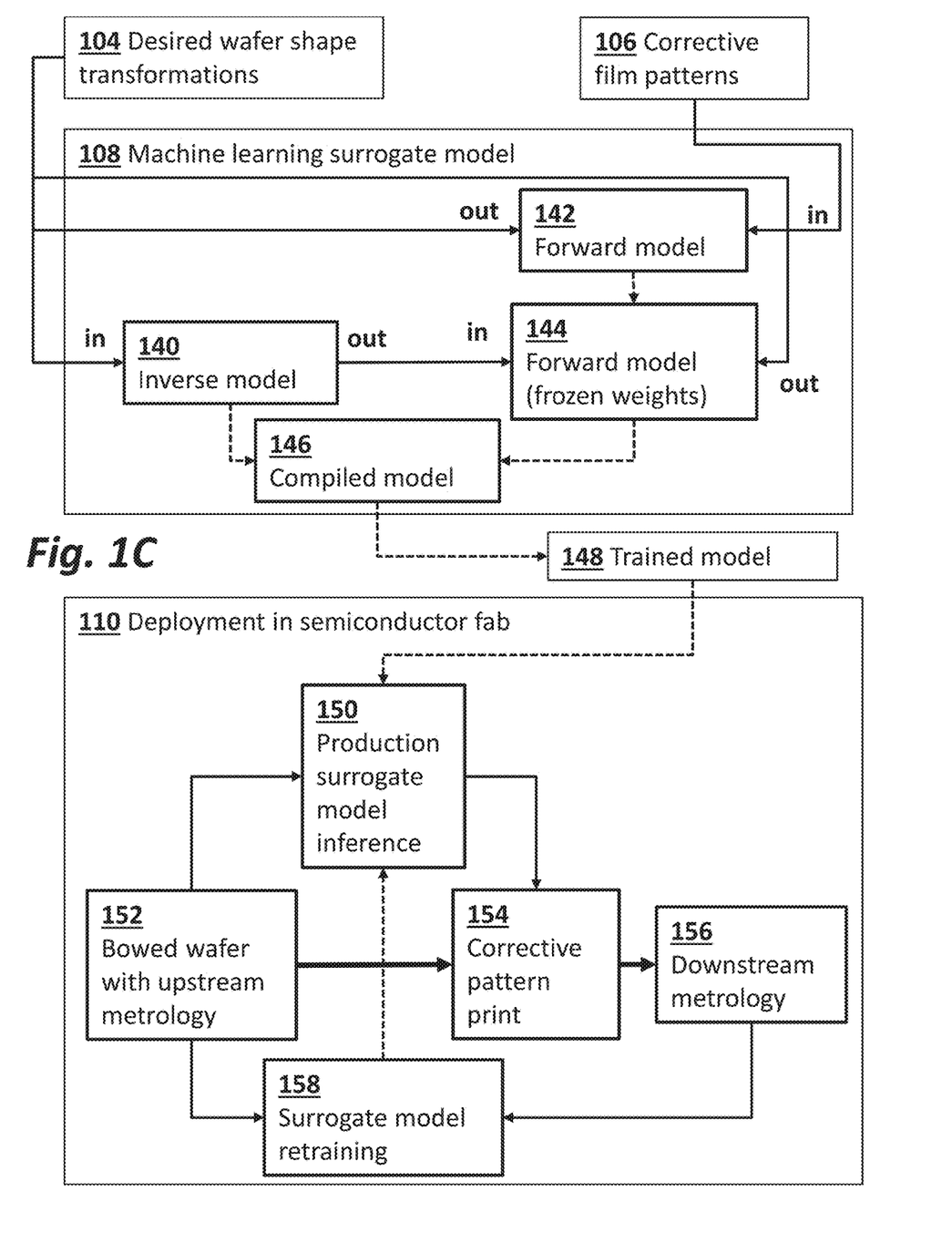
Figure 5:
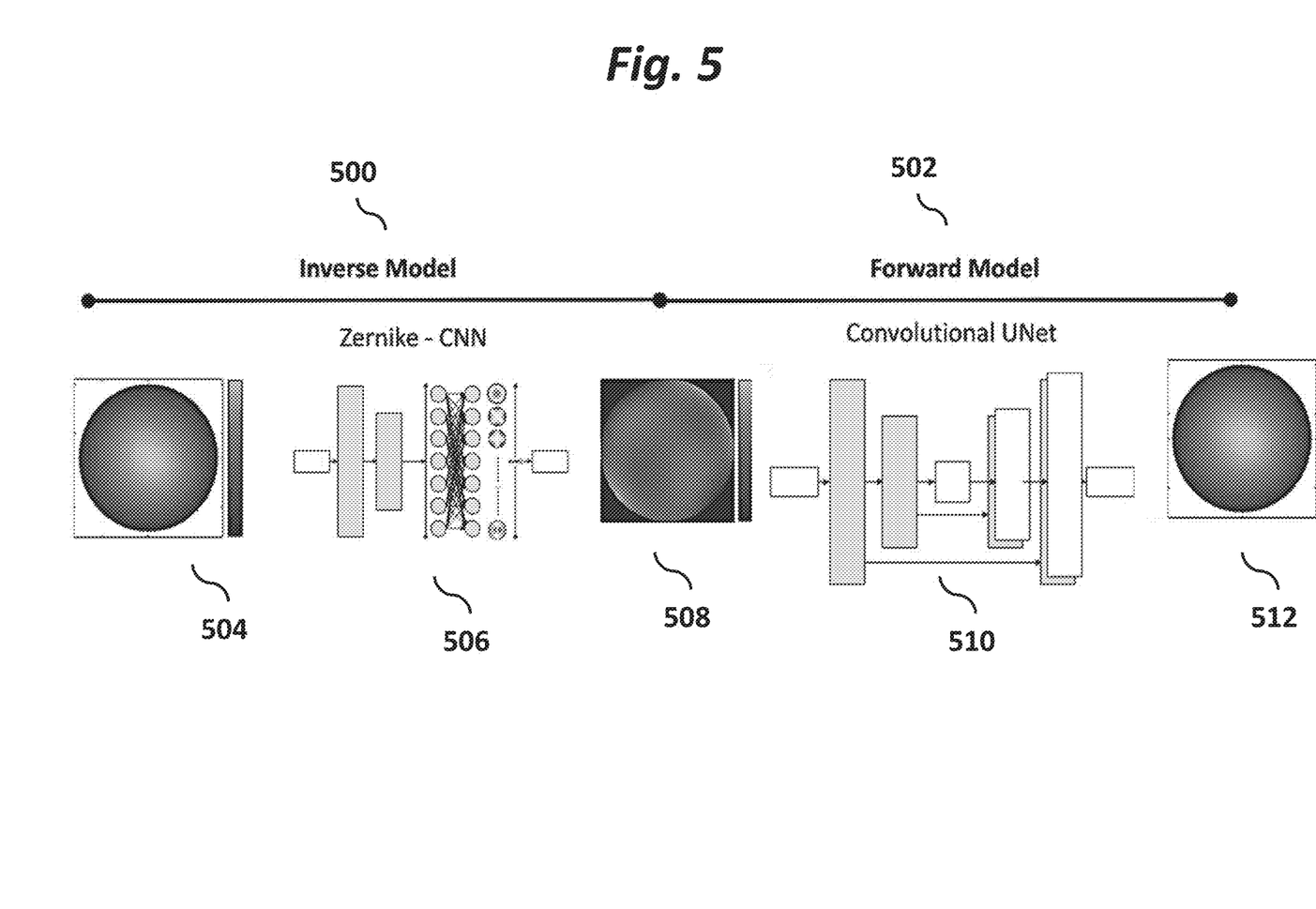
FIG. 5 shows details of a surrogate model architecture according to an embodiment of the invention.

FIG. 1C shows details of the machine learning surrogate model training 108 and deployment 110 of that trained model 112 in production. The surrogate model employed here for the wafer bow problem is a deep neural network based upon the convolutional neural network architecture discussed in section 3.3. In production 110, the input is a wafer bow shape 152, and the model 148 is used to infer 150 the best corrective film 154 to print to transform the wafer shape into a new shape that will minimize overlay error. For example, one objective is to make the wafer as flat as possible which will reduce overlay error. Because the FEM simulation can predict the wafer shape transformation based on the corrective film, determining the corrective film from the desired wafer shape transformation can be considered the inverse problem. We desire a model that can input desired wafer shape transformation, then output the corrective film pattern as well as the predicted actual shape transformation (although, in some cases, it may not be possible to make the wafer perfectly flat). Thus, our model has an inverse model-forward model architecture, where the inverse model 140 determines film pattern as output based on wafer shape transformation input and the forward model 142, 144 determines wafer shape transformation output based on the film pattern input. FIG. 5 provides additional details of the surrogate model architecture. The inverse model 500 uses a convolutional neural network 506 to output corrective film pattern 508 based on wafer shape transformation 504. The forward model 502 uses a convolutional neural network 510 to output wafer shape transformation 512 based on corrective film pattern 508.

Returning to FIG. 1C, during inference (in production), a desired wafer shape transformation is input to the surrogate model 150, where the desired wafer shape transformation is simply the negative of the wafer bow signature measured in 152 if the objective is to make the wafer flat. Then the model returns both the recommended corrective film pattern and the resulting shape transformation predicted upon application of that corrective film pattern. The corrective film pattern is then used in the semiconductor process to print a corrective film 154 (see FIG. 8.). The predicted residual bow after deposition of corrective film is the difference between input and output shapes.

The forward model 142, 144 uses a convolutional UNet and the inverse model 140 uses a Zernike CNN. Both are described in detail below.

4.5.1 Forward Model Details

Figure 6:
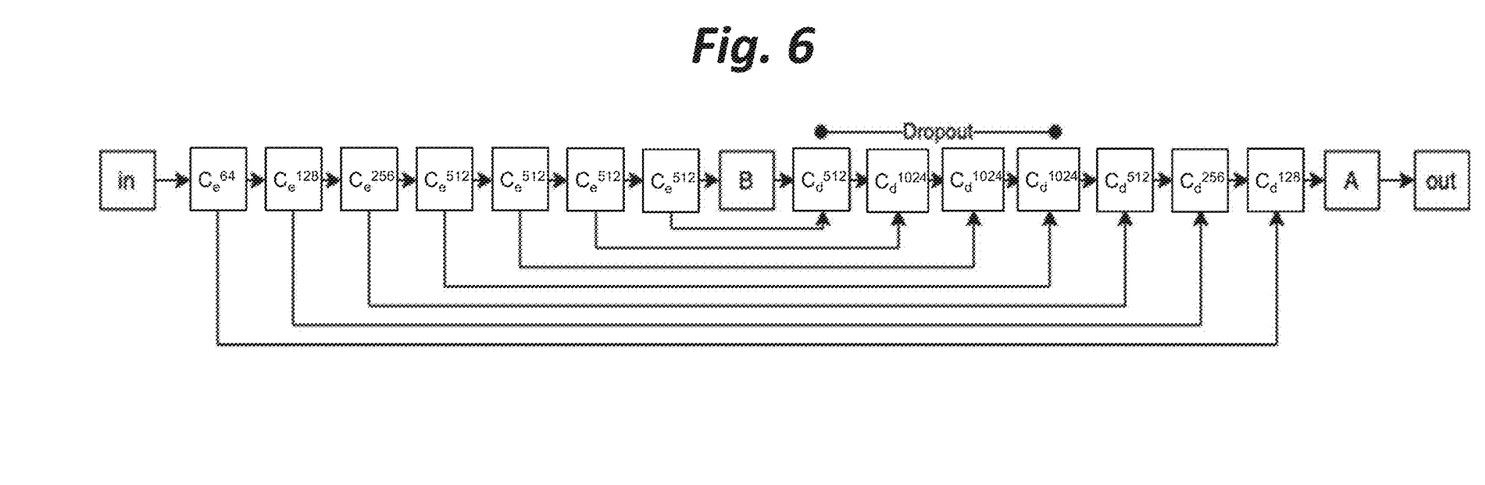
FIG. 6 shows a UNet architecture of forward component of surrogate model according to an embodiment of the invention.

The architecture used for the forward model 142, 144 (predicting wafer shape transformation from film pattern) is a convolutional UNet (FIG. 5, 502). This structure is a specialized case of an encoder-decoder model where the encoder down-samples into the bottleneck and the decoder up-samples to the resulting output array. The encoder part functions similarly to a typical convolutional neural network (CNN) with a series of convolution operations to extract features from the inputs. FIG. 6 details the UNet architecture of the forward model in the surrogate model. It includes symmetric skip connections at each layer which enable low frequency information to pass through from input to output. In the encoder/down-sampling section, in the first three layers the number of features is doubled each layer. In the decoder section, each step up-samples the feature map followed by an up-convolution to reduce the number of feature channels and then concatenates with the skip connection from its sibling layer in the encoder section. Collectively, the UNet architecture has been proven to yield faster training and better performance with smaller datasets than alternative architectures for many tasks including image-to-image translation and image segmentation [22-24].

As shown in FIG. 6, each encoder and decoder unit is denoted with subscript "e" and "d" respectively. The encoder unit $C_e^{64}$ denotes a 2D convolution layer with 64 filters, kernel size of 4×4, stride length of 2 (in each dimension), followed by batch normalization and Leaky ReLU activation. Batch normalization (standardization of inputs to a layer by mini-batches during training) is useful for deep neural networks since it accelerates training (prevents internal covariate shift) and provides some regularization (note that the very first encoder layers does not employ batch normalization). The decoder unit $C_d^{512}$ denotes a transposed 2D convolution layer with 512 filters, kernel size of 4×4, stride length of 2, followed by batch normalization and ReLU activation. The first several decoder layers also employ dropout for further regularization. The B layer denotes the bottleneck (a simple convolution layer) and the A denotes tanh activation to output. All layers have weights initialized with a random normal distribution.

In practice, the above general architecture is used, yet specific hyperparameters are tuned by running many experiments with train-validation dataset split and choosing the set of hyperparameters that minimize the validation set error. Typically, the mean of the mean squared error is the metric used in network training (take the difference between predicted shape and actual shape, square it, take mean across shape, then take mean across samples). The Adam optimizer is typically used for optimizing the network. Some hyperparameters than can be tuned by validation error examination include number of decoder and encoder layers, number of filters in each layer, dropout fraction in dropout layers, Leaky slope of Leaky ReLU, batch size, and the learning rate and beta parameters for the Adam optimizer.

The compiled surrogate model 146 at inference time sends inputs to the inverse model 140 then to the forward model 144. However, in training the overall surrogate model, the first step is providing the desired dataset to the forward model, where the film pattern is the input to the UNet and the wafer shape is the output. Then, the hyperparameters can be tuned and the forward model can be trained until the forward model performance is satisfactory. The weights of the forward model can then be frozen, and the model can be used to train the inverse and compiled models as described below.

4.5.2 Inverse Model Details

The forward model 142 is first trained using the film pattern as the input and the wafer shape transformation as the output. Then, the inverse 140 and compiled 146 model are trained by loading the pre-trained forward model, freezing the weights in the forward model layers 144, then training the compiled model using the wafer shape transformation as both input and output. A Zernike CNN is used as the inverse model. Basically, this is a CNN with multiple convolutional layers with a fully connected output, which is similar to a CNN that could be used for image classification. The difference is that the units in the last dense layer in the fully connected output provide the Zernike coefficients that are used to build the film pattern shape according to eq. 13 above. The Zernike CNN strategy allows for regularization of the film pattern output to bias towards smooth film patterns that are practically attainable.

Figure 7:
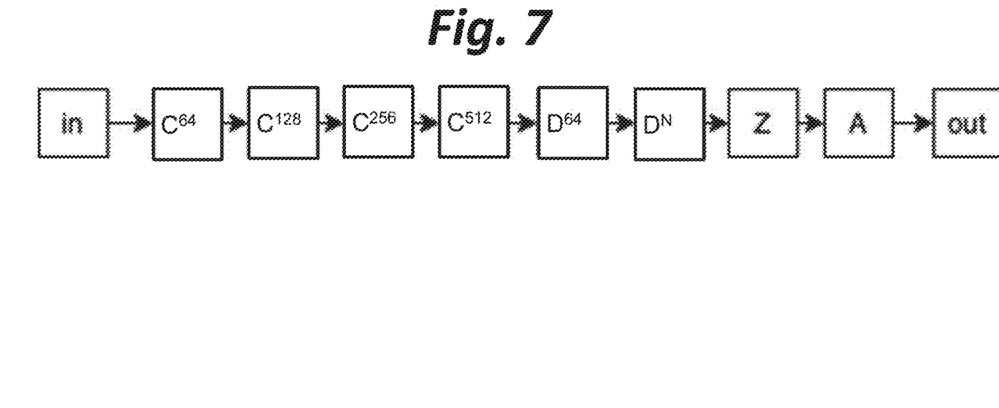
FIG. 7 shows a Zernike CNN inverse model architecture according to an embodiment of the invention.

The details of the Zernike CNN inverse model are shown in FIG. 7. The input wafer shape transformation is sent to a series of convolution layers to create feature maps, where here $C^{64}$ denotes a 2D convolution layer with 64 filters, kernel size of 3×3, stride length of 1 (in each dimension), with ReLU activation and 2D max pooling with pool size of 2. After the last convolution layer, the output is flattened then fully connected to a dense layer, where $D^{64}$ denotes a dense layer with 64 units and dropout. The $D^{64}$ is fully connected to a second dense layer which contains N Zernike coefficients (the $c_a$ coefficients in equation 13). The "Z" layer constructs a wafer shape transformation using equation 13 with the $c_a$s from the previous layer. The result is sent to tanh activation and output.

The Zernike CNN returns a film pattern given a wafer shape transformation. During training, for each input wafer shape transformation, the resulting film pattern is then sent into the pre-trained forward model (which returns a wafer shape transformation given a film pattern). The compiled model is trained by minimizing the difference between the input shape of the inverse model and the output shape from the forward model (again the mean of the mean squared error is typically used as the error function). The forward model weights are frozen during training of the compiled model so that only the weights in the inverse model are modulated. The inverse/compiled model also uses a training-validation split to choose a set of hyperparameters to minimize validation error. Some hyperparameters that can be optimized in the inverse model include number of convolution layers, number of convolution filters in each layer, number of dense layers and units, dropout fraction in the fully connected layers, number of Zernike modes (which dictates number of units in last dense layer), and learning rate and beta parameters for the Adam optimizer.

Figure 8:
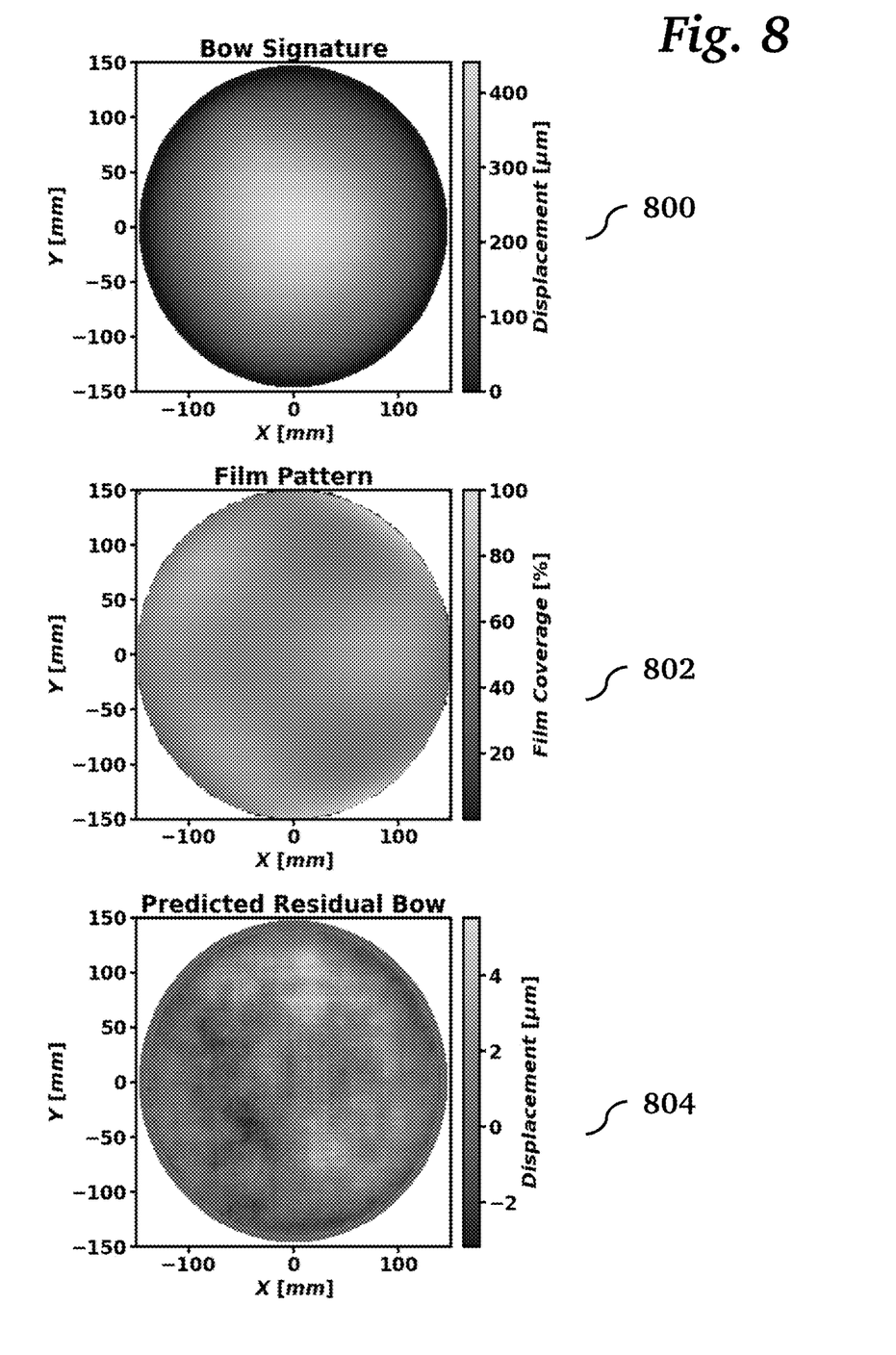
FIG. 8 shows an example of a film pattern and residual bow prediction, for the task of taking an input wafer bow signature and flattening the wafer, according to an embodiment of the invention.

FIG. 8 illustrates an example of a wafer bow signature 800 input and the corrective film pattern 802 and the predicted residual bow output 804 generated by the surrogate model. Here, the surrogate model prediction time for a single instance is ~0.1 seconds (3-4 orders of magnitude faster than FEM), and the prediction time is even faster when many wafer shape transformations are processed at the same time.

4.5.3 Alternative Model Architectures

The detailed model description in section 4.5.1 and 4.5.2 provide just one surrogate model concept which has demonstrated excellent performance for this task. There are several other model concepts that could also be used as the surrogate model for wafer bow corrective film pattern determination, including alternative UNet/Zernike-CNN designs, generative adversarial networks, or probabilistic encoder-decoder networks.

Above we describe using a UNet as the forward model and a Zernike CNN as the inverse model, yet other promising strategies include using a UNet as both the forward and inverse model, using a Zernike CNN as both the forward and inverse model, or using a UNet as the inverse model and a Zernike CNN as the forward model. In general, the Zernike CNN provides greater shape regularization (bias towards smooth shapes) while the UNet is more versatile to fit a 2D function with higher variance/noise. Generally, experiments show that both the UNet and Zernike-CNN will perform well as the forward model where the output directly impacts the network cost function, and thus the best choice will depend on training dataset size and compute resources. In general, if the dataset size and compute resources are not limiting, then the UNet will likely allow for a closer fit to a greater variety of wafer shape transformations. In contrast, in the mode the inverse model is trained (where the inverse model output does not directly impact the cost function), the regularization and bias toward smooth 2D functions that the Zernike CNN provides seems beneficial, but this could also depend on the precise dataset.

Another model concept is a conditional generative adversarial network (cGAN) [25], such as the pix2pix model [24]. A GAN model has a different training strategy where a generator and discriminator model try to fool each other, and both get better over time. The task of the generator model here is to generate an image that is a realistic pair to some input image, while the task of the discriminator is to classify input image pairs as real or fake (where the fake pairs are provided by the generator). The generator could have a UNet architecture, and the discriminator could have a simple CNN architecture for binary classification (real or fake). Another strategy is to use patches so that rather than determining if an entire image pair is real or fake, this is done on small patches across the image [24]. The cGAN strategy has many benefits for image-to-image translation tasks (where here, image-to-image translation could mean film pattern to wafer shape transformation or wafer shape transformation to film pattern translation). The adversarial loss preserves high frequency "sharpness" in the images, in contrast to models that are trained using mean squared error which blur high frequency information. Another advantage is that in cases where there are multiple plausible result images that are equally valid (as perhaps in the case of the inverse wafer bow problem), the cGAN will provide one distinct good solution rather than an average of various possible good solutions. Despite these theoretical benefits, our experiments show that the UNet and Zernike CNN models trained with mean squared error give better results and have more stable training than cGAN approaches.

Another model concept is the probabilistic encoder-decoder. Examples of these strategies include the conditional variational autoencoder [26,27] and the probabilistic UNet [28]. In these approaches, the result is a probability distribution at each position on the result 2D array rather than a precise shape. We found that the compiled model strategy involves taking the expected value of film pattern and wafer shape transformation calculations, so the benefit of a probabilistic approach is not directly evident. However, using a probabilistic model could enable benefits in the active learning and on-line retraining steps described below.

4.6 Active Learning for Further Wafer Bow Reduction

After the compiled surrogate model is trained from scratch using the FEM dataset, the model can be further improved through re-training using data from actual wafers. These improvements can be realized either pre-production using a validation dataset or on-line in production.

4.6.1 Model Improvements Using Active Learning with a Validation Dataset

As discussed in section 4.3, a secondary dataset containing metrology on physical wafers can be used to learn any differences between the simulated wafer bow behavior and the behavior of real wafers. In this mode, the dataset is likely much smaller than the simulated dataset because the cost per sample is much greater. Thus, a specialized active learning approach is used to choose the best film patterns to get the greatest model improvement for a small amount of examples in the validation dataset.

Active learning is a field of machine learning where unlabeled data is abundant but labeled examples are scarce. An uncertainty estimator is used to determine the unlabeled examples with maximum uncertainty, and these are chosen to be labeled by an oracle with the assumption that these examples will provide the maximum benefit to the model. However, our case is a bit different than the typical active learning problem because a) the distribution of data is different between original training and new labels from the oracle and b) the compiled surrogate model is deterministic (no probability distribution available). Thus, we employ a batch mode "auxiliary model" approach, where a probabilistic auxiliary model is trained on the error in the validation dataset, then samples are chosen for the next batch using a combination of high error and high uncertainty. In practice, the active learning model suggests batches of film patterns to print for validation, then updates the surrogate model with this new validation data, then suggests a new batch for validation. This process repeats until model performance on the validation data is satisfactory.

4.6.2 Model Improvements On-Line During Production

In production, the surrogate model retraining 158 will be provided with consistent feedback in the form of downstream metrology results 156 from a subset of wafers. This data can be used to monitor the surrogate model performance and retrain and update the production model 150 as necessary. A retraining policy will be implemented that specifies batch size, sample weight, and model training hyperparameters (e.g. optimizer learning rate, number of training epochs, model freeze layers, etc.). As metrology data is sent to the model, re-training will occur following the retraining policy, and training-validation-test splits within the new data will be used to determine benefit over currently deployed models (where validation is used to determine best re-training policy, then test set is used to estimate performance of new model on unseen data). When a significant benefit is detected, the process owner will be alerted that the new model is available and can decide when to deploy the update. This process enables a surrogate model that is robust to dataset drift in a dynamic fabrication environment.

REFERENCES (1) Brunner, T. A.; Menon, V. C.; Wong, C. W.; Gluschenkov, O.; Belyansky, M. P.; Felix, N. M.; Ausschnitt, C. P.; Vukkadala, P.; Veeraraghavan, S.; Sinha, J. K. Characterization of Wafer Geometry and Overlay Error on Silicon Wafers with Nonuniform Stress. Journal of Micro/Nanolithography, MEMS, and MOEMS. 2013, p 043002. DOI: 10.1117/1.jmm.12.4.043002.

(2) Brunner, T.; Menon, V.; Wong, C.; Felix, N.; Pike, M.; Gluschenkov, O.; Belyansky, M.; Vukkadala, P.; Veeraraghavan, S.; Klein, S.; Hoo, C. H.; Sinha, J. Characterization and Mitigation of Overlay Error on Silicon Wafers with Nonuniform Stress. Optical Microlithography XXVII. 2014. DOI: 10.1117/12.2045715.

(3) Veeraraghaven, S.; Turner, K. T.; Sinha, J. Simulation of Non-Uniform Wafer Geometry and Thin Film Residual Stress on Overlay Errors. Metrology, Inspection, and Process Control for Microlithography XXV. 2011. DOI: 10.1117/12.879493.

(4) Janssen, G. C. A. M.; Abdalla, M. M.; van Keulen, F.; Pujada, B. R.; van Venrooy, B. Celebrating the 100th Anniversary of the Stoney Equation for Film Stress: Developments from Polycrystalline Steel Strips to Single Crystal Silicon Wafers. Thin Solid Films 2009, 517 (6), 1858-1867.

(5) Chen, C.-M.; Yu, C.-Y.; Tsai, C.-S.; Hwang, H.-Y. D. Reducing Wafer Distortion through a Low CTE Layer. 8476146, Jul. 2, 2013.

(6) O'rourke, S.; Loy, D.; Jiang, H. Assemblies and Methods for Reducing Warp and Bow of a Flexible Substrate during Semiconductor Processing, 2014.

(7) Storck, P.; Sachs, G.; Rothammer, U.; Thapa, S. B.; Schwenk, H.; Dreier, P.; Muemmler, F.; Mayrhuber, R. Layered Semiconductor Substrate with Reduced Bow Having a Group III Nitride Layer and Method for Manufacturing It. 10192739, Jan. 29, 2019.

(8) Moore, J. T.; Deboer, S. J.; Fischer, M. Semiconductor Wafer Assemblies Comprising Silicon Nitride, Methods of Forming Silicon Nitride, and Methods of Reducing Stress on Semiconductive Wafers. 5985771, Nov. 16, 1999.

(9) Hooge, J.; Ip, N.; Estrella, J.; deVilliers, A. Amelioration of Global Wafer Distortion Based on Determination of Localized Distortions of a Semiconductor Wafer. 10622233, Apr. 14, 2020.

(10) Devilliers, A. J.; Mathews, T. A. Systems and Methods for Generating Backside Substrate Texture Maps for Determining Adjustments for Front Side Patterning, 2015.

(11) Kang, H.; deVilliers, A. J. Substrate Holding Apparatus and Method for Shape Metrology. 20190283218:A1, Sep. 19, 2019.

(12) Devilliers, A. J.; Fulford, D. Location-Specific Tuning of Stress to Control Bow to Control Overlay in Semiconductor Processing, 2019.

(13) Devilliers, A. J. Method for Correcting Wafer Bow from Overlay, 2017.

(14) Wallace, J. M.; Hommema, J. A.; Searles, K. H.; Hsu, S.-Y.; Wan, J.; Grueschow, E. R. Space-Time Surrogate Models of Subterranean Regions. 9043189, May 26, 2015.

(15) Lam, K. P.; Lee, Y. M.; Liu, F.; Snowdon, J. L.; Yang, J.; Zhang, R. Optimal Selection of Building Components Using Sequential Design via Statistical Based Surrogate Models. 20140365180:A1, Dec. 11, 2014.

(16) Itu, L. M.; Passerini, T.; Sharma, P. Method and System for Personalized Non-Invasive Hemodynamic Assessment of Renal Artery Stenosis from Medical Images. 10595790, Mar. 24, 2020.

(17) Usadi, A.; Li, D.; Parashkevov, R.; Terekhov, S. A.; Wu, X.; Yang, Y. Methods and Systems for Machine-Learning Based Simulation of Flow. 9187984, Nov. 17, 2015.

(18) Tallman, J. A.; Tucker, E.; Zacharias, R.; Gallo, A.; Russo, V. Autonomous Surrogate Model Creation Platform. 20200042659:A1, Feb. 6, 2020.

(19) Feng, X.; Huang, Y.; Rosakis, A. J. On the Stoney Formula for a Thin Film/Substrate System With Nonuniform Substrate Thickness. J. Appl. Mech. 2007, 74 (6), 1276-1281.

(20) Pureza, J. M.; Lacerda, M. M.; De Oliveira, A. L.; Fragalli, J. F.; Zanon, R. A. S. Enhancing Accuracy to Stoney Equation. Appl. Surf. Sci. 2009, 255 (12), 6426-6428.

(21) Zernike, von F. Beugungstheorie Des Schneidenverfahrens Und Seiner Verbesserten Form, Der Phasenkontrastmethode. Physica 1934, 1 (7), 689-704.

(22) Ronneberger, O.; Fischer, P.; Brox, T. U-Net: Convolutional Networks for Biomedical Image Segmentation. In Medical Image Computing and Computer-Assisted Intervention—MICCAI 2015; Springer International Publishing, 2015; pp 234-241.

(23) Jansson, A.; Humphrey, E.; Montecchio, N.; Bittner, R.; Kumar, A.; Weyde, T. Singing Voice Separation with Deep U-Net Convolutional Networks; openaccess.city.ac.uk, 2017.

(24) Isola, P.; Zhu, J.-Y.; Zhou, T.; Efros, A. A. Image-to-Image Translation with Conditional Adversarial Networks. In Proceedings of the IEEE conference on computer vision and pattern recognition; openaccess.thecvf.com, 2017; pp 1125-1134.
(25) Goodfellow, I. J.; Pouget-Abadie, J.; Mirza, M.; Xu, B. Generative Adversarial Networks. arXiv preprint arXiv 2014.
(26) Kingma, D. P.; Welling, M. Auto-Encoding Variational Bayes. arXiv [stat.ML], 2013.
(27) Rezende, D. J.; Mohamed, S.; Wierstra, D. Stochastic Backpropagation and Approximate Inference in Deep Generative Models. In Proceedings of the 31st International Conference on Machine Learning; Xing, E. P., Jebara, T., Eds.; Proceedings of Machine Learning Research; PMLR: Bejing, China, 2014; Vol. 32, pp 1278-1286.
(28) Kohl, S. A. A.; Romera-Paredes, B.; Meyer, C.; De Fauw, J.; Ledsam, J. R.; Maier-Hein, K. H.; Ali Eslami, S. M.; Rezende, D. J.; Ronneberger, O. A Probabilistic U-Net for Segmentation of Ambiguous Images. arXiv [cs.CV], 2018.

The invention claimed is:

1. A method for generating a corrective film pattern for reducing wafer bow in a semiconductor wafer fabrication process, the method comprising:
measuring, using one or more metrology apparatuses, a bowed semiconductor wafer to produce a wafer bow signature for a predetermined semiconductor fabrication step;
inputting, to a surrogate machine learning model, the wafer bow signature, the surrogate machine learning model comprising:
a forward model comprising a first neural network model configured to take as input corrective film patterns and output corresponding wafer shape transformations, and
an inverse model comprising a second neural network model configured to take as input wafer shape transformations and output corresponding corrective film patterns;
generating, by the surrogate machine learning model, a corrective film pattern corresponding to the wafer bow signature,
wherein the corrective film pattern is adapted for depositing on a semiconductor wafer a corrective film having spatially varying stress signature;
wherein the surrogate machine learning model is trained with a training dataset of target wafer shape transformations and corresponding training corrective film patterns by:
training the forward model using the training corrective film patterns, and
training the inverse model using the target wafer shape transformations and a set of wafer shape transformations output by the trained forward model.

2. The method of claim 1, wherein the training dataset is generated using a simulation to compute the training corrective film patterns from the target wafer shape transformations for the predetermined semiconductor fabrication step.

3. The method of claim 1, wherein the training dataset is generated by experimentally determining the training corrective film patterns corresponding to the target wafer shape transformations.

4. The method of claim 1, wherein the training dataset is generated using a finite element method to solve a linear elasticity problem, and using an optimization framework to select the target wafer shape transformations that minimize a cost function.

5. The method of claim 1, further comprising performing active learning feedback to refine the surrogate machine learning model.

6. The method of claim 1, wherein the surrogate machine learning model is implemented with a conditional variational autoencoder.

7. The method of claim 1, wherein the surrogate machine learning model is implemented with a conditional generative adversarial network.

8. The method of claim 7, wherein the conditional generative adversarial network includes a generator implemented as a U-Net with skip connections.

9. The method of claim 7, wherein the conditional generative adversarial network includes a discriminator implemented as a convolutional classifier.

* * * * *